United States Patent [19]

Emery

[11] Patent Number: 5,221,119

[45] Date of Patent: Jun. 22, 1993

[54] SNAP-ON THERMOFORMED TRUCK BED LINER

[75] Inventor: Phillip L. Emery, Portage, Wis.

[73] Assignee: Penda Corporation, Portage, Wis.

[21] Appl. No.: 919,068

[22] Filed: Jul. 23, 1992

[51] Int. Cl.$^5$ .............................................. B60R 13/01
[52] U.S. Cl. .................................... 296/39.2; 220/403
[58] Field of Search ................... 296/39.1, 39.2, 39.3; 224/42.42; 220/410, 403

[56] References Cited

U.S. PATENT DOCUMENTS

| 4,047,749 | 9/1977 | Lambitz et al. | 296/39.2 |
| 4,181,349 | 1/1980 | Nix et al. | 296/39 |
| 4,336,963 | 6/1982 | Nix et al. | 296/39.2 |
| 4,341,412 | 7/1982 | Wayne | 296/39.2 |
| 4,572,568 | 2/1986 | Kapp et al. | 296/39 |
| 4,595,229 | 6/1986 | Wagner | 296/39 |
| 4,789,574 | 12/1988 | Selvey | 428/31 |
| 4,796,914 | 1/1989 | Raynor | 296/39.2 X |
| 4,796,942 | 1/1989 | Robinson et al. | 296/39 |
| 4,850,633 | 7/1989 | Emery | 296/39 |
| 4,906,040 | 3/1990 | Edwards | 296/39 |
| 4,944,162 | 7/1990 | Abstetar et al. | 296/39 |
| 5,044,682 | 9/1991 | Wayne | 296/39.2 |
| 5,046,775 | 9/1991 | Marcum, Jr. et al. | 296/39 |

Primary Examiner—Joseph D. Pape
Attorney, Agent, or Firm—Lathrop & Clark

[57] ABSTRACT

A bed liner has a bottom panel with two upwardly extending side panels and a front panel extending upwardly between the side panels. A front rail extends frontwardly from the front panel and has a lip which extends downwardly. The front rail is adapted to overlie the front rail of a vehicle truck box. The bed liner is thermoformed such that two undercut tabs extend rearwardly from the front rail lip beneath a truck box front rail. The tabs engage within a cavity formed in the front rail and snap in place to hold the liner fixed with respect to the truck box. Portions of the liner front panel are undercut to extend horizontally beneath the liner front rail towards the undercut tabs.

20 Claims, 6 Drawing Sheets

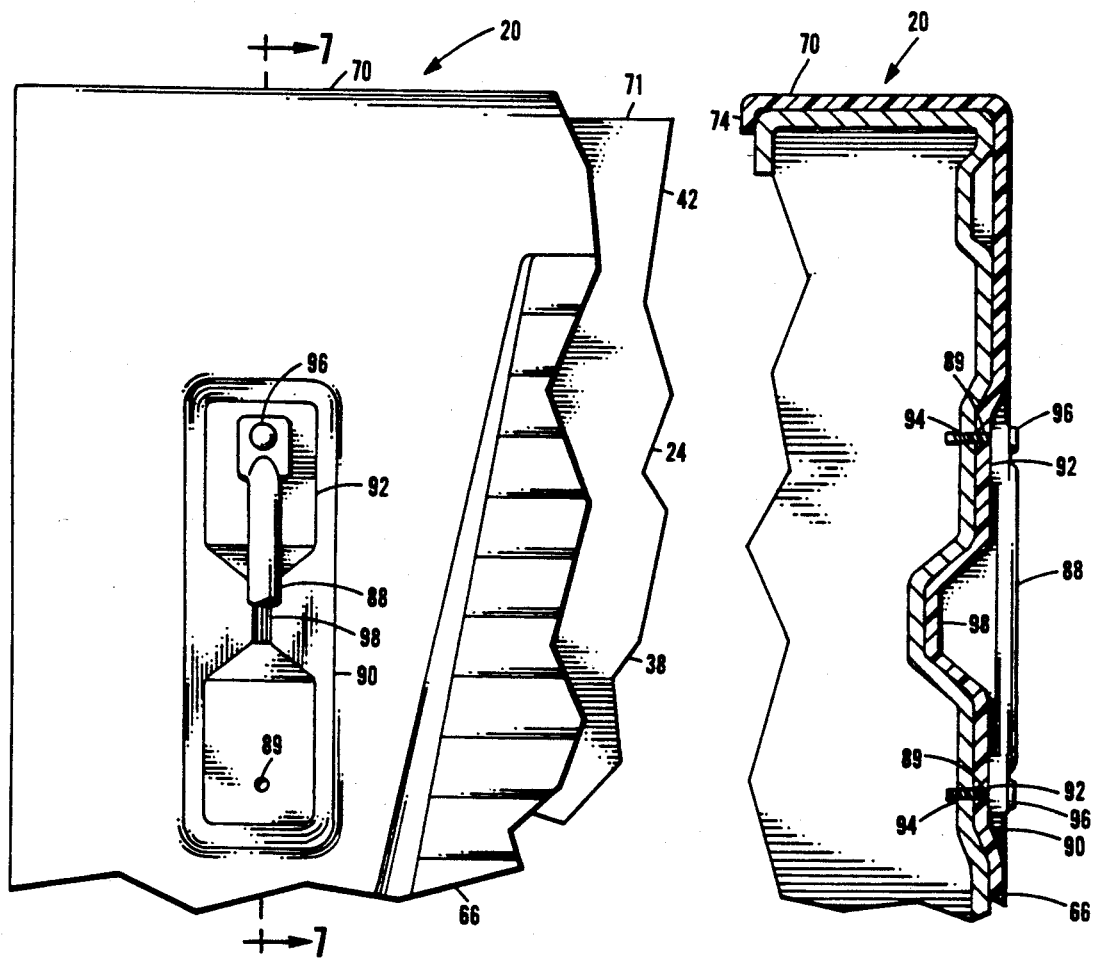
FIG. 6  FIG. 7
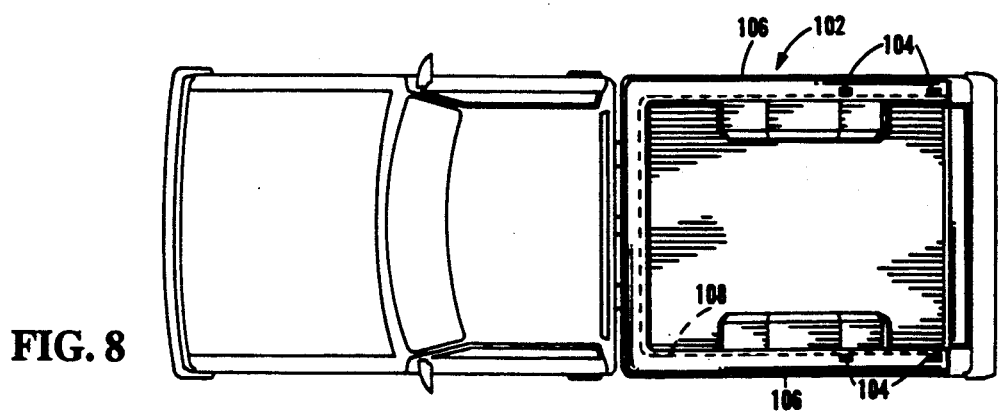
FIG. 8

SNAP-ON THERMOFORMED TRUCK BED LINER

FIELD OF THE INVENTION

This invention relates to truck bed liners in general and to thermoformed thermoplastic truck bed liners in particular.

BACKGROUND OF THE INVENTION

Although long used in agricultural and commercial applications, pick-up trucks with open cargo beds have also become increasingly popular as personal and family vehicles. The commercial vehicle owner, although concerned with performance and cost effectiveness of the vehicle, often considers the vehicle as a traveling company advertisement or symbol. A neat and well-maintained vehicle is more likely to favorably impress customers. Owners of personal vehicles, while concerned with functionality and efficiency, are also concerned with pride of ownership, personal image, and outward appearances. In addition, the automotive enthusiast desires to maintain his vehicle in as close to a "like new" condition as possible.

Truck bed liners of plastic or rubber are commonly employed to protect the painted metal surfaces of a pick-up truck cargo bed. These truck bed liners are available in a wide variety of configurations to suit the wide variety of available trucks. Bed liners protect the cargo bed from scratching and denting as well as paint fading from exposure to sunlight and elements. One-piece thermoformed thermoplastic truck bed liners provide a cost effective means of protecting the truck cargo bed. To retain the somewhat flexible bed liner in place within the cargo bed however, conventional bed liners require a plurality of fasteners extending between the bed liner and the rigid metal truck box. In some cases, bed liners require that fastener receiving holes be drilled into the sheet metal of the truck box.

Other truck bed liners make use of inwardly facing gaps beneath the truck box side rails for the insertion of expansion fasteners which may be securely engaged with the side rails without penetrating the steel surfaces. However, some makes of trucks have no inwardly facing gaps. A truck bed liner that eliminates the need for auxiliary fasteners would be highly desirable.

A truck bed liner which could be rapidly installed with a minimum of additional fasteners by an unskilled installer could be sold at reduced cost.

What is needed is a truck bed liner which may be securely installed on the pick-up truck box without piercing the vehicle sheet metal and with a minimum of additional fasteners.

SUMMARY OF THE INVENTION

The truck bed liner of this invention may be snapped on to a pick-up truck box and held in place with a minimum of additional fasteners. The bed liner has a unitary thermoformed thermoplastic body having two facing undercut molded portions. The liner has a bottom panel which has two upwardly extending side panels and a front panel which extends between the side panels. The body substantially fills the cargo bed of the vehicle truck box. A liner front rail extends frontwardly from the front panel and has a downwardly extending front lip. The liner front rail overlies the truck box front rail and the liner lip is adjacent to the truck box front rail front surface. A preferred embodiment has two undercut protruding tabs which are thermoformed with the liner body and which extend rearwardly from the liner lip. Each tab extends beneath the truck box front rail. The bed liner is attached to the vehicle truck box by engaging the tabs beneath the front rail such that the rail is engaged between the tab and the liner front rail and is also engaged between the liner lip and the liner front panel. The liner front panel preferably has an undercut portion that extends towards the tabs beneath the liner front rail.

In a preferred embodiment portions of the liner side panels extend outwardly to engage against the truck box side walls such that manufacturer-supplied tiedown bars may be fastened to the truck box side walls through the liner side panels.

Each liner tab has a rearwardly extending portion which engages with the lower edge of a vehicle truck box front rail and a frontwardly extending portion which extends from the rearwardly extending portion and which is joined at the sides to the rearwardly extending portion to form a generally rigid shell.

It is an object of the present invention to provide a truck bed liner which may be rapidly installed.

It is also an object of the present invention to provide a truck bed liner which may be attached to a vehicle truck box without the need for piercing the vehicle sheet metal.

It is another object of the present invention to provide a truck bed liner which may be economically thermoformed of thermoplastic material.

It is a further object of the present invention to provide a truck bed liner which may be attached with a minimum of fasteners.

It is yet another object of the present invention to provide a truck bed liner which may be attached to a truck box with only manufacturer-supplied fasteners.

Further objects, features and advantages of the invention will be apparent from the following detailed description when taken in conjunction with the accompanying drawings.

DESCRIPTION OF THE DRAWING

FIG. 6 is a fragmentary side elevational view of a side panel of the bed liner of FIG. 1 showing tiedown fastener attachment.

FIG. 7 is a cross-sectional view of the bed liner of FIG. 6 taken along section line 7—7.

FIG. 8 is a top plan view of an alternative embodiment of the thermoformed thermoplastic truck bed liner of the present invention mounted with under-the-rail fasteners.

DESCRIPTION OF THE PREFERRED EMBODIMENTS

Figure 1:
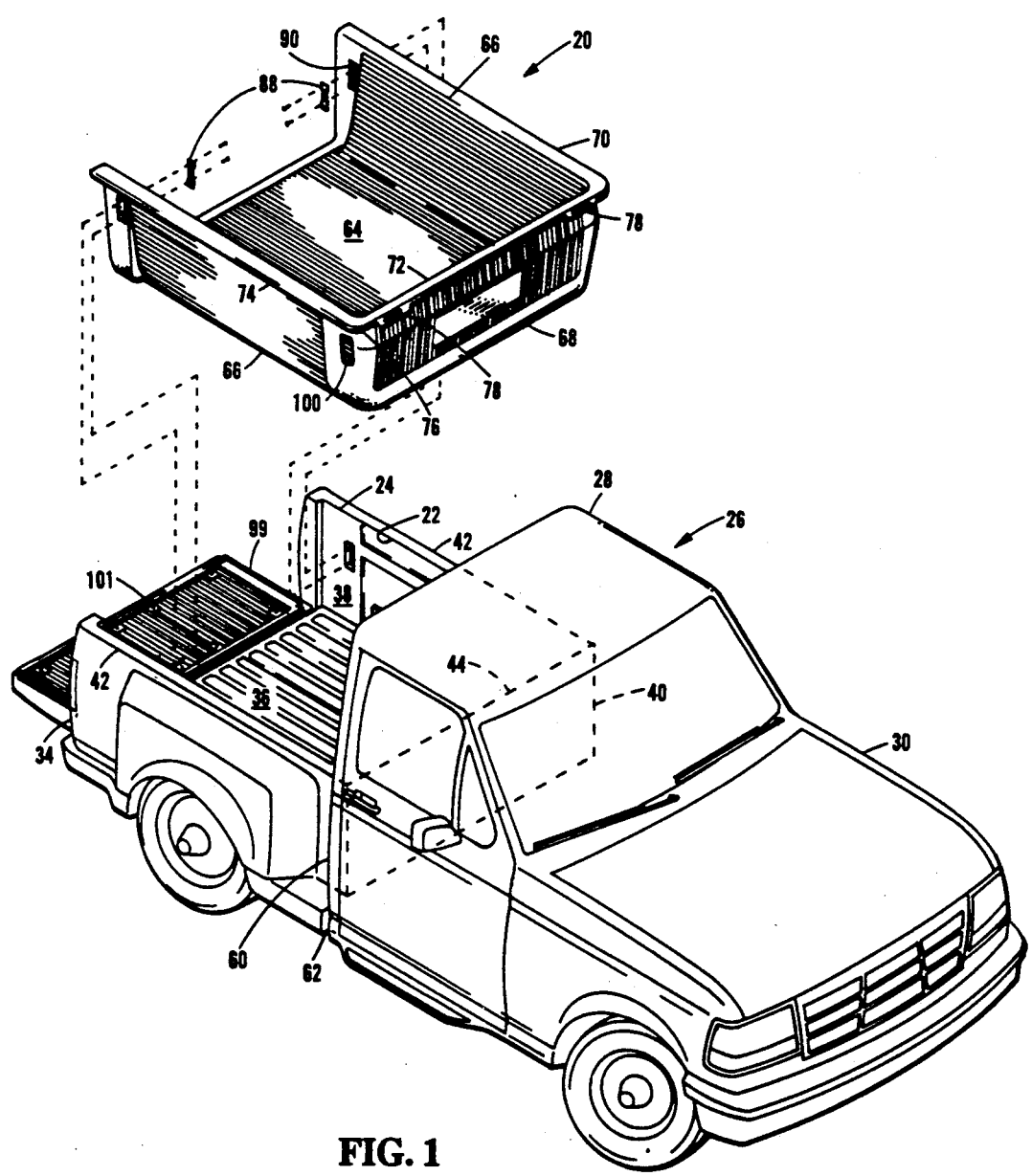
FIG. 1 is an exploded isometric view of the truck bed liner of the present invention and an exemplary pick-up truck.

Referring more particularly to FIGS. 1-7 wherein like numbers refer to similar parts, a truck bed liner 20 for snap-on installation within the cargo bed 22 of the truck box 24 of a vehicle 26 is shown in FIG. 1. The vehicle illustrated is similar to a 1992 F-150 Flareside Truck manufactured by Ford Motor Company, but is exemplary only of a conventional pick-up truck. The bed liner 20 is dimensioned to substantially fill and protect the cargo bed 22 of the vehicle 26. Although the illustrated embodiment is configured to the exemplary vehicle 26, it should be observed that bed liners may be formed which are configured to other manufacturers' vehicles.

Figure 4:
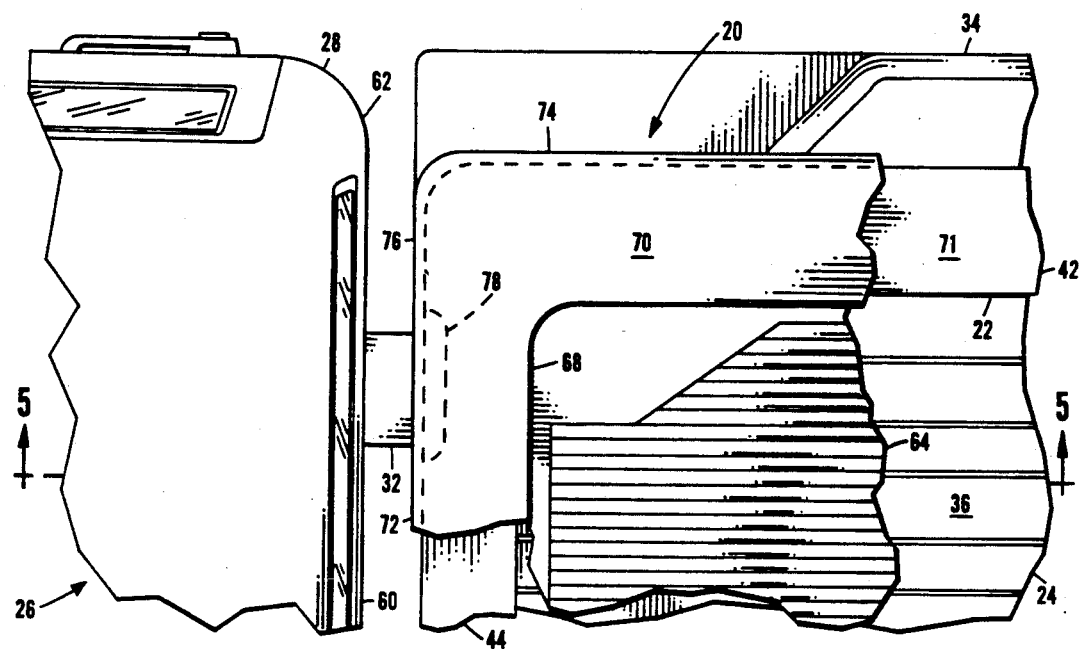
FIG. 4 is a fragmentary top plan view of the installed truck bed liner of FIG. 3.
Figure 5:
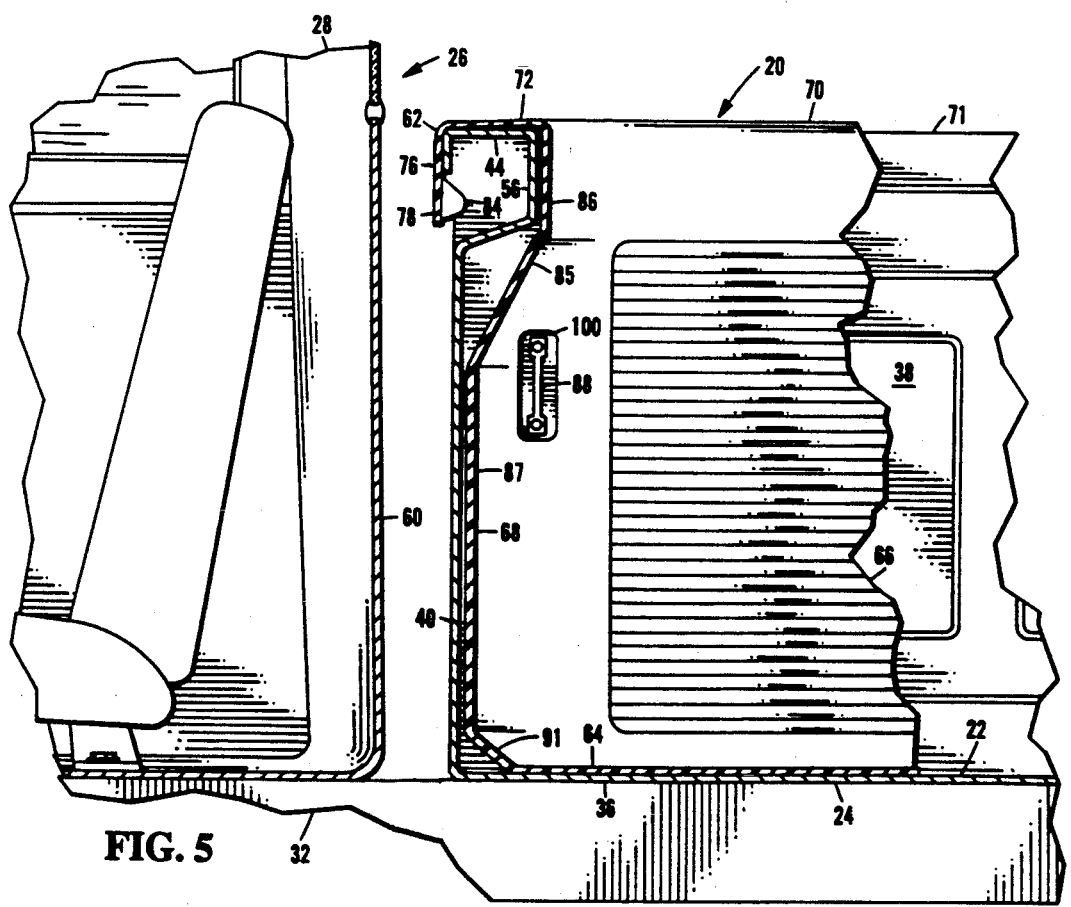
FIG. 5 is a cross-sectional view of the truck bed liner of FIG. 4 taken along section line 5—5.

The pick-up truck 26 is conventional and exemplary of vehicles of its type in that it has a passenger cab 28 for driver and passenger accommodation together with an engine compartment 30 containing the engine and other mechanical workings of the vehicle and a truck box 24 which is distinct and separate from the cab 28 and connected to the cab and engine compartment by the vehicle frame 32, shown in FIGS. 4 and 5.

The truck box 24 defines the cargo bed 22 on its interior and on its exterior is faced with painted body panels 34. The truck box is formed of stamped and welded metal sheet, usually steel. The truck box 24 has a bottom wall 36 with two upwardly extending side walls 38 and a frontwardly facing front wall 40. The narrow steel sheet of the truck box 24 walls 36, 38, 40 are imparted with rigidity by forming them into stiffer structures through stamping and other forming processes. The upper perimeters of the side walls 38 are rolled to form roughly C-shaped side rails 42. The illustrated truck box 24 has side rails which open downwardly exterior to the cargo bed 22. Vehicles with truck box side rails which open towards the cargo bed are also known.

Figure 3:
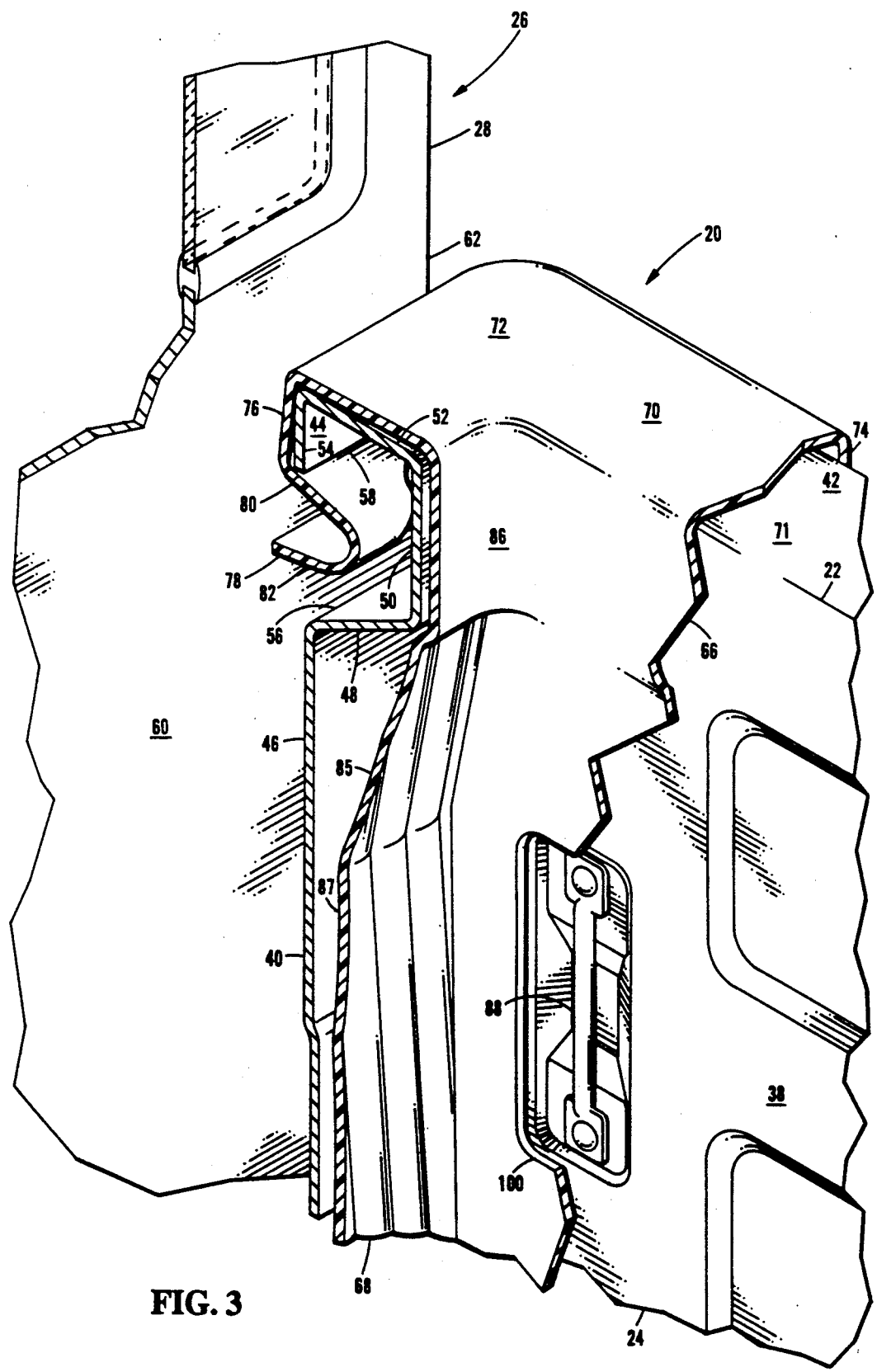
FIG. 3 is a fragmentary isometric view, partially broken away, of the truck bed liner of FIG. 1 mounted within the truck box of a pick-up truck.

The truck box front wall 40 has a front rail 44 which is also generally C-shaped. As best shown in FIG. 3., the front wall 40 has a generally vertical segment 46 which extends upwardly from the bottom wall 36. The rail 44 is formed by a rearwardly and upwardly inclined lower segment 48 which extends from the vertical segment 46, a rear segment 50 which extends vertically from the lower segment 48, a top segment 52 which extends frontwardly and generally horizontally from the rear segment 50, and a front segment 54 which extends downwardly from the top segment 52. The front segment 54 is less than one half the height of the rear segment 50. Hence a frontwardly opening front rail cavity 56 is defined by the front rail 44.

The front segment 54 of the front rail 44 has a downwardly facing lower edge 58. Such an untrimmed exposed sheet metal edge is generally undesirable in a vehicle exterior, but unfinished edges of this sort are utilized by automotive manufacturers at locations on the vehicle which are not exposed to view or to frequent motorist contact.

The front wall 40 of the truck box 24 is almost entirely hidden from view as it is closely spaced from the rear wall 60 of the vehicle cab 38, as shown in FIG. 5. The front segment 54 of the truck box front wall 40 is separated by a gap 62 of approximately ⅜-1 inches from the cab rear wall 60. It should be noted that the front rail cavity is simply a necessary effect of the rigid structural configuration provided by the front rail 44. The cavity 56 does not contain any automotive parts, nor does it perform any function.

As shown in FIG. 1, the truck bed liner 20 is thermoformed from a single sheet of thermoplastic material, preferably high density polyethylene, and is a unitary article. The bed liner 20 has a bottom panel 64 with two upwardly extending side panels 66 which are joined by a front panel 68 which extends upwardly from the bottom panel 64. The side panels 66 have generally horizontal outwardly extending sides rails 70 which are adapted to overlie the upper surfaces 71 of the truck box side rails 42 as shown in FIG. 4. Narrow side lips 74 extend downwardly from the bed liner side rails 70 and lie alongside the outwardly facing segments of the truck box side rails 42. As shown in FIG. 3, the bed liner front panel 68 has a frontwardly extending front rail 72 which overlies the top segment 52 of the truck box front rail 44. A front lip extends downwardly from the bed liner front rail 72 approximately the height of the truck box front rail front segment 54. The bed liner front lip 76 extends the width of the bed liner 20.

Figure 2:
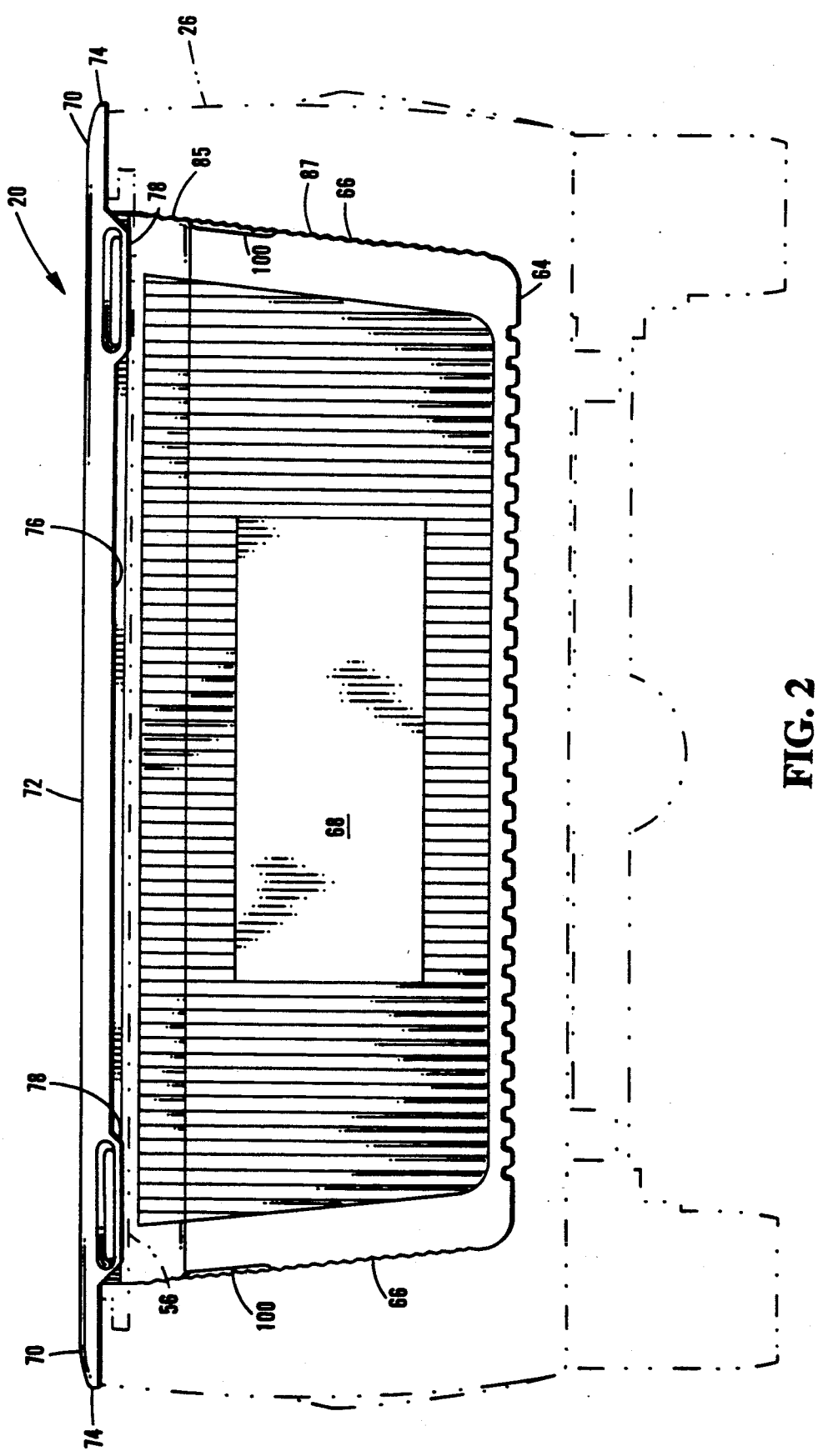
FIG. 2 is a front elevational view of the truck bed liner of FIG. 1, with the vehicle truck box shown in phantom.

In a preferred embodiment the bed liner 20 has an undercut member which extends beneath the front rail 72, shown in FIGS. 2, 3 and 5. In single sheet thermoforming practice, an undercut portion of a part is that portion which extends horizontally beneath a part portion which is less deep within the female thermoforming mold. The undercut member of the bed liner 20 is comprised of an inclined downwardly and frontwardly extending segment 85, a vertical segment 87 which extends downwardly from the segment 85 and a rearwardly extending inclined segment 91 which joins the segment 87 to the bottom panel 64 of the liner 20. The undercut segments 85, 87, 91 extend horizontally beneath the liner front rail 72 for a more close fitting engagement of the liner front panel 68 with the front wall 40 of the truck box 24.

The bed liner 20 departs from previously known thermoformed thermoplastic truck bed liners in providing a second undercut member which is opposite the first undercut segments and which extends towards the first undercut segments. The second undercut members comprise two tabs 78. The tabs 78 depend from the front rail 72 on the front lip 76 opposite the undercut portions of the front panel 68 and extend toward the undercut portions of the front panel horizontally beneath the rail 72. The front lip 76, as shown in FIGS. 3 and 4, defines an outwardly and frontwardly facing perimeter edge of the bed liner 20 from which the undercut tabs 78 depend.

The bed liner 20 of this invention utilizes the front rail cavity 56 by providing an integral fastening means which is thermoformed with the bed liner 20. This means for fastening the bed liner to the cargo bed 22 is provided by the two thermoformed tabs 78 which extend rearwardly from the bed liner front lip 76. Each tab 78 is in the form of a flattened frontwardly opening shell. As shown in FIG. 3, each tab has a rearwardly extending portion 80 which joins with a frontwardly extending portion 82 and which has two side portions 84 which join the rearwardly extending portion 80 to the frontwardly extending portion 82. The tabs 80 are thus provided with rigidity by this cup-like structure.

To impart greater stiffness against warping or bending of the bed liner front rail 72, the front rail lip 76 is of greater depth where it extends between the two tabs 78, as shown in FIG. 2.

When the bed liner 20 is installed in the truck box 24, as shown in FIGS. 3, 4 and 5, the tabs 78 engage with the truck box front rail 44 and fasten the bed liner 20 to the truck box 24. As best shown in FIG. 3, vertical movement of the bed liner 20 with respect to the truck box 24 is restrained by the engagement of the truck box front rail front segment 54 between the bed liner front rail 72 and the rearwardly extending portions 80 of the tabs 78. Front-to-back movement of the bed liner 20 is restricted by the engagement of the truck box front rail front segment 54 and rear segment 50 between the bed liner front lip 76 and the generally vertical rim 86 of the bed liner front panel 68.

The tabs 78 extend within the front rail cavity 56 beneath the front rail top segment 52. The lower edge 58 of the front rail front segment 54 will press against the rearwardly inclined rearwardly extending portion 80 of each tab 78 as the bed liner 20 is jostled up and down in response to movement of the vehicle 26 over a road surface. As shown in FIG. 5, the undercut segments 85, 87, 91 of the liner front panel 68 also serve to limit upward travel of the liner 20. The vertical undercut segment 87, by engaging against the front wall 40 of the truck box 24 also serves to limit forward motion of the liner 20. The geometry and dimensions of each tab 78 are such that in order for the tabs to come free of their engagement within the front rail cavity 56 it would be necessary to flex the tabs into a fully vertical position. A sufficient force to bring about such a deformation should not be encountered in safe operation of the vehicle.

The bed liner 20 is advantageously installed with great simplicity. The entire bed liner 20 is elevated above the truck box 24 and rotated roughly about an axis passing through the bed liner front rail 72 to position the bed liner front lip 76 and tabs 78 over the gap 62 between the truck box front wall 40 and the cab rear wall 60. The bed liner 20 is then lowered into position within the cargo bed 22, with the tabs 78 descending into the gap 62 first. As the tabs 78 enter the gap 62, they may initially engage against the front segment 54 of the truck box front rail 44. The tabs 78, and more particularly the front lip 76, are somewhat flexible due to their construction of thermoplastic material of thin section. This flexibility allows the tabs 78 to flex outwardly utilizing the lip 76 as a hinge and to snap into position within the front rail cavity 56.

Once installed, the bed liner 20 may not be removed by lifting vertically on the liner rails 70, 72. To remove the bed liner 20, it will generally be necessary to tip the bed liner forwardly and further may be necessary to insert an implement under the truck box front rail 44 to push the plastic tabs 78 outwardly.

Due to the great length of the cargo bed 22, attachment of the bed liner 20 and the front rail 44 alone will not completely immobilize the bed liner. To bring about the necessary restraint of the bed liner 20 it is necessary to fasten the bed liner 20 to the truck box 24 at a rearward position.

To eliminate the need for additional fasteners, the rear of the bed liner 20 is preferably fastened using manufacturer supplied fasteners. In vehicles supplied by the manufacturer with removable tiedown bars 88 the bed liner side panels 66 are provided with depressions 90 which extend outwardly to engage against the cargo bed side walls 38. The depressions 90 each have platforms 92 which engage against portions of the truck box side walls surrounding fastener holes 94. Fasteners 96 extend through the tiedown bar 88 and fastener holes 89 in the bed liner depression platforms 92 to threadedly engage with a truck box side wall 38. A further recess 98 is provided within the bed liner depression 90 between the platforms 92 so that a cord may be conveniently passed around the tiedown bar 88 preserving its original function. Thus the tiedown bars 88 fasten the bed liner in place without sacrificing their usefulness as tiedown bars.

Tiedown bar depressions 90 are located on each side panel 66 of the bed liner 20 and together with the two tabs 78 provide four secure attachment points for the bed liner 20. For access to tiedown bars 88 located in the front of the cargo bed 22, tiedown access openings 100 are preferably provided.

The truck bed liner 20 is thus seen to be mountable to the cargo bed of a truck with nothing more than manufacturer supplied original equipment fasteners. Such an arrangement advantageously reduces the cost of obtaining a bed liner to the consumer, and further reduces inventory and storage requirements for suppliers and retailers of the bed liners who need not maintain supplies of specialized fasteners. Furthermore, the bed liner 20 may rapidly be installed within a purchaser's cargo bed. It is only a matter of minutes to remove the four conventional bolt fasteners attaching the tiedown bars to the unlined truck box, drop the bed liner into position, and reattach the tiedown bars.

It should be noted that, although the tabs 78 undercut the liner front rail, the depth of the tabs is sufficiently narrow that effective nesting and stacking of the liners 20 during storage and transport is not adversely effected.

The vehicle 26 has a fold-down tailgate 99 which is preferably protected with a separate thermoformed thermoplastic tailgate liner 101. The tailgate liner 101 is preferably attached utilizing fastener holes in the tailgate 99 provided by the manufacturer. The tailgate liner 101 and bed liner 20 together provide protection for the four sides of the enclosed cargo bed 22.

Wherever manufacturer supplied fasteners are located in appropriate side wall locations, on trucks other than the illustrated vehicle, a bed liner of this invention may utilize fastening depressions for connecting the rear of the bed liner to the truck box. However, some makes of pick-up truck will not be provided with conveniently located original equipment fasteners. In such situations an alternative bed liner 102, shown in FIG. 8, may be employed.

The alternative bed liner 102 is identical in all respects to the bed liner 20 except that depressions for tiedown bars or similar fastening hardware are omitted. The alternative bed liner 102 employs a noninvasive fastener such as the one disclosed in U.S. Pat. No. 4,850,633 and available from Penda Corporation of Portage, Wis. The disclosure of said patent is incorporated herein by reference. The noninvasive fasteners are shown schematically in FIG. 8 and are adapted to engage the side rails 106 without piercing the sheet metal of the truck box 108. A conventional bed liner installed utilizing noninvasive fasteners would require fasteners in the forward end and the rearward end of the bed liner. The bed liner 102 requires only fasteners 104 in the rearward portion of the bed liner 102 as the tabs (not shown) securely engage the front portion of the bed liner.

It may thus be seen that, depending upon the configuration of the vehicle to which the bed liner of this invention is mounted, additional fasteners may be eliminated altogether, or the total number of additional fasteners required may be reduced. Furthermore, by providing an integral fastener in the form of the unitary thermoformed thermoplastic tabs, one possible site of rust or corrosion is eliminated. There is no danger of the tabs becoming separated from the bed liner or of scratching the surface of the truck, as might be the case with conventional metal fasteners.

Figure 10:
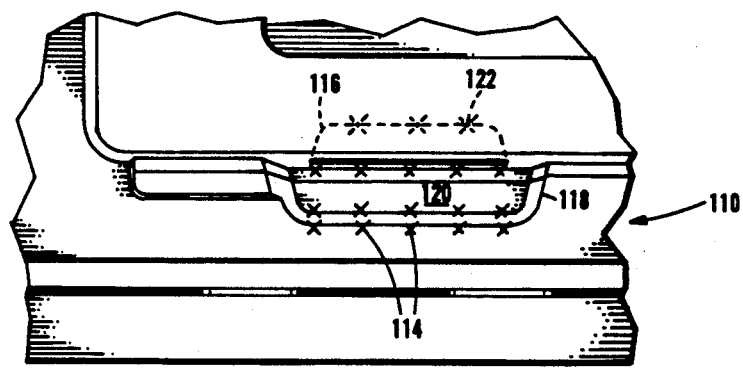
FIG. 10 is a fragmentary top plan view of the thermoforming mold utilized in forming the part of FIG. 9 with suction holes illustrated schematically.

The best mode of manufacturing the bed liners 20, 102 of the present invention employs commonly available single sheet thermoforming equipment which is conventional and known to the art together with a novel thermoforming vacuum mold 110, the relevant portion of which is shown in FIG. 10.

Figure 9:
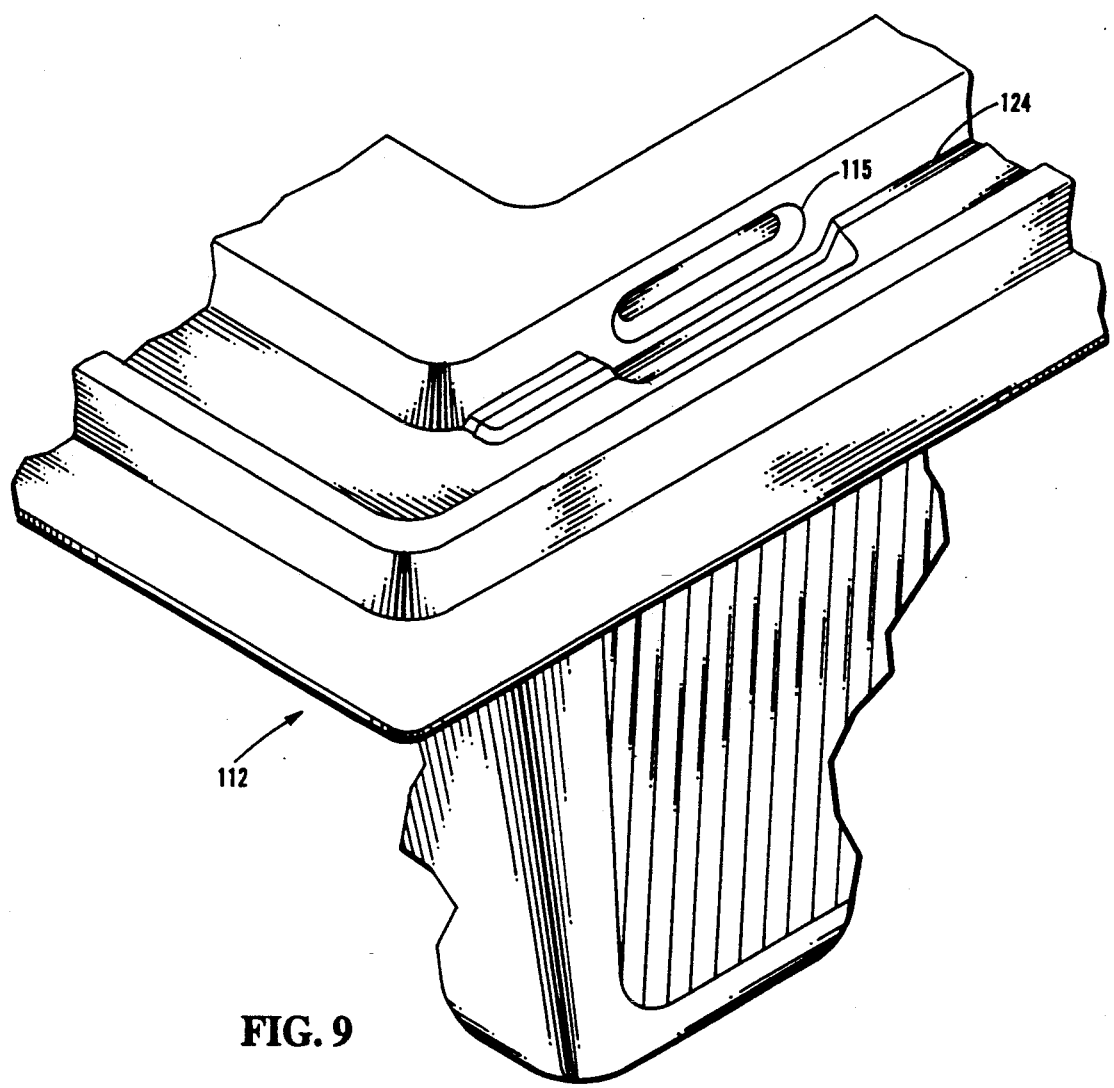
FIG. 9 is a fragmentary isometric view of an untrimmed thermoformed plastic part utilized in forming the truck bed liner of FIG. 1.

The thermoforming mold 110 is used to produce the untrimmed part 112 shown in FIG. 9. The thermoforming mold 110 is preferably machined aluminum with a multiplicity of vacuum ports 114 formed in a conventional manner therein. The mold 110 forms a part 112 with a severely undercut depression 116 which, once routed or trimmed, will become the tab 78. The part 112 is formed from an extruded polyethylene sheet approximately 0.25 inches thick.

Severely undercut portions, such as the depression 115, are generally undesirable and are traditionally avoided in forming large thermoformed articles such as a bed liner. Thermoformed thermoplastic articles are formed by first heating an extruded sheet of thermoplastic material beneath a bank of controlled heat lamps. The heated and semi-molten sheet is positioned over a vacuum forming mold and brought into contact with the mold while a vacuum is drawn on the multiplicity of vacuum ports. The vacuum draws the semi-molten plastic into contact with the vacuum forming mold. Typically, the mold is then cooled by circulating liquid therethrough, and the part is removed by an upward lifting thereof. After removal from the mold the part is trimmed and routed for final use. To facilitate release of the thermoformed part from the thermoforming mold, surfaces of the part are typically designed to have an outwardly inclined release angle such that the upward travel of the molded part away from the mold is unobstructed.

An undercut depression extending beneath a molded surface would be expected to greatly restrict consistent and repeatable release of the part from the mold. A double undercut part 112 would be expected to present even greater difficulties. However, in the mass production of hundreds of truck bed liners embodying the double undercut portions of the present invention, satisfactory release has been observed.

The mold 110 machined for the purpose of producing the bed liner 20, 102 of the present invention, has a vertically recessed trough 118 adjacent to and beneath the mold depression 116. Vacuum ports 114, shown schematically as x's, are located at the base 120 of the trough and serve to draw semi-molten plastic down to a level beneath the horizontal undercut depression 116. By drawing plastic downward into the trough, thermoplastic material is positioned so as to be acted upon the vacuum ports 122 within the depression 116 allowing plastic to be drawn within the depression 116 to form the tabs of the bed liner. A part 112, formed from a 0.25 inch thick sheet will typically have a front rail thickness of approximately 0.20 inches and tab wall thickness of half that amount.

It has been observed that in thermoforming the parts 112, satisfactory release of the undercut tabs from the depression 116 is repeatably obtainable. The thermoformed plastic sheet at the time of release from the mold 110, although cooled to a nonplastic state, remains highly elastic, and may be drawn freely from the mold 110.

The molded part 112, after it is completely cooled is trimmed to form the bed liner 20 or 102 by moving a router along the rail lips and the molded-in routing guide recess 124.

It should be noted that, although the tabs have been shown as rectangular and generally cup-shaped, they may be formed of any appropriate geometry to engage with recesses provided in a particular manufacturer's truck box. Furthermore, one, two or more tabs may be utilized where desirable.

Although the tabs of the bed liner of the present invention have been shown as being located exclusively on the front of the liner for engagement with the truck box front rail, it should be noted that tabs having similar properties could be provided for side mounting of the liner, if a particular vehicle had an outwardly opening cavity into which such tabs might engage. Although it is current commercial practice to avoid such cavities for aerodynamic and appearance purposes, provision of side cavities in narrow sections for engagement of bed liners is a possible design approach for truck manufacturers.

It is understood that the invention is not confined to the particular construction and arrangement of parts herein illustrated and described, but embraces all such modified forms thereof as come within the scope of the following claims.

I claim:

1. A thermoformed thermoplastic truck bed liner for mounting within a vehicle truck box having a front rail, comprising:
   a) a bottom panel and two side panels extending upwardly from opposite sides of the bottom panel;
   b) a front panel extending upwardly from the bottom panel and between the side panels, portions of the front panel defining a first undercut segment;
   c) a front rail extending frontwardly from the front panel, the liner front rail having a front lip which extends downwardly, wherein the liner front rail is adapted to overlie the front rail of the vehicle truck box; and
   d) at least one undercut protruding tab extending rearwardly from the liner front lip beneath the liner front rail and toward the first undercut segment, wherein each tab is adapted to extend beneath the front rail of the vehicle truck box, and wherein the bed liner may be secured within the vehicle truck box by engaging each tab beneath a front rail of said truck box, such that the truck box rail is engaged between the tab and the liner front rail, and such that the truck box front rail is further engaged between the liner front lip and the liner front panel.

2. The thermoformed thermoplastic truck bed liner of claim 1 wherein the liner front panel has a substantially vertical rim extending downwardly from the liner front rail, and the first undercut segment extends downwardly and frontwardly beneath the front panel rim.

3. The thermoformed thermoplastic truck bed liner of claim 1 wherein each undercut tab is a frontwardly opening shell.

4. A thermoformed thermoplastic truck bed liner for mounting within a vehicle truck box having a front rail, comprising:
   a) a bottom panel with two upwardly extending side panels, and a front panel extending upwardly from the bottom panel between the side panels;
   b) a front rail extending frontwardly from the front panel, the liner front rail having a front lip which extends downwardly, wherein the liner front rail is adapted to overlie the front rail of the vehicle truck box; and
   c) at least one undercut protruding tab extending rearwardly from the liner front lip beneath the liner front rail, wherein each tab is adapted to extend beneath the front rail of the vehicle truck box, and wherein the bed liner may be secured within the vehicle truck box by engaging each tab beneath a front rail of said truck box, such that the truck box rail is engaged between the tab and the liner front rail, and such that the truck box front rail is further engaged between the liner front lip and the liner front panel.

5. The truck bed liner of claim 4 further comprising portions of the liner front panel which define an undercut segment which extends frontwardly beneath the liner front rail.

6. The truck bed liner of claim 4 further comprising portions of the liner side panels which extend outwardly, the outwardly extending portions being adapted to engage against a truck box side wall such that fasteners may be positioned to connect the extending portions to the truck box side wall.

7. The truck bed liner of claim 4 wherein two rearwardly protruding tabs extend from the liner front rail lip, and wherein a first tab is closely spaced from one liner side panel, and a second tab is closely spaced from the other liner side panel.

8. The thermoformed thermoplastic truck bed liner of claim 4 wherein the liner front panel has a generally vertical rim which is adapted to engage with the vehicle truck box front rail rearwardly of the liner front rail lip.

9. The thermoformed thermoplastic truck bed liner of claim 4, wherein each protruding tab has a rearwardly extending portion which is adapted to engage with a lower edge of a vehicle truck box front rail, and each tab has a portion which extends frontwardly from and beneath the rearwardly extending portion, wherein side portions connect the rearwardly extending and frontwardly extending portions to form a generally rigid tab structure.

10. A thermoformed thermoplastic truck bed liner for mounting within a vehicle truck box with a front wall having at least one frontwardly and downwardly facing segment, the bed liner comprising:
   a) a bottom panel adapted to overlie the bottom wall of a truck box;
   b) two side panels which extend upwardly from the bottom panel to overlie the side walls of said truck box;
   c) a front panel which extends upwardly from the bottom panel and is adapted to overlie a front wall of said vehicle truck box, wherein the front panel adjoins the two side panels;
   d) a front rail which extends frontwardly from the liner front panel, the liner front rail being adapted to overlie a truck box front rail;
   e) a lip which extends downwardly from the liner front rail; and
   f) at least one tab which extends rearwardly from the lip beneath the liner front rail, the tab being adapted to engage with the vehicle truck box frontwardly and downwardly facing segment such that upward displacement of the bed liner with respect to the truck box is restricted.

11. The thermoformed thermoplastic truck bed liner of claim 10 wherein the tab extends rearwardly from the liner front rail lip a distance which is less than the width of the gap formed between a truck cab rear wall and truck box of the vehicle to which the liner is to be mounted.

12. The truck bed liner of claim 10 further comprising portions of the liner side panels which extend outwardly, the outwardly extending portions being adapted to engage against a truck box side wall such that fasteners may be positioned to connect the extending portions to the truck box side wall.

13. The thermoformed thermoplastic truck bed liner of claim 10 wherein each tab has a rearwardly extending portion and a portion extending frontwardly from the rearwardly extending portion, and side portions that connect the rearwardly and frontwardly extending portions to define a stiff shell.

14. A single sheet unitary thermoformed thermoplastic truck bed liner for mounting within a cargo bed defined by a vehicle truck box having a vertical front wall and two sidewalls, the truck box walls having a horizontal rail, the bed liner comprising:
   a) a bottom panel integrally formed with three upwardly extending panels adapted to overlie the truck box front and side walls and protect the cargo bed of the truck box;
   b) a horizontally extending liner rail integrally formed with each of the upwardly extending panels, each liner rail being adapted to overlie the horizontal rail of the truck box and to extend away from the cargo bed; and
   c) a thermoplastic thermoformed means for fastening the liner to the truck box, wherein the fastening means is integrally formed with a liner rail and extends downwardly and inwardly beneath said liner rail toward the cargo bed, the fastening means being adapted to engage the truck box exterior to the cargo bed.

15. The truck bed liner of claim 14 wherein the integral fastening means comprises a tab mounted by an elastic hinge to a liner rail, the tab being elastically biased to a position in spaced parallel relation to an upwardly extending panel of the liner.

16. The truck bed liner of claim 14 wherein at least one upwardly extending liner panel has portions which step outwardly to more nearly conform to the truck box, the outwardly stepped portions having recesses, the recesses having bottoms, and wherein portions of the bottoms define fastener holes, and wherein the bottom portions of the recesses are adapted to be clamped against a wall of the truck box by original equipment tiedown brackets which have been removed from a truck box and reassembled to the truck box with portions of the bottoms of the recesses clamped therebetween.

17. The truck bed liner of claim 14 wherein the bed liner is attached to a truck box solely by the fastening means and by original equipment tiedown brackets which have been removed from a truck box and reassembled to the truck box with portions of the truck bed liner clamped therebetween.

18. A thermoformed thermoplastic truck bed liner for mounting within a vehicle truck box having a bottom wall and two side walls which extend upwardly from the bottom wall and a front wall extending from the bottom wall between the side walls, the bed liner comprising:
   a) a bottom panel adapted to overlie the bottom wall of a truck box;
   b) two side panels which extend upwardly from the bottom panel to overlie the truck box side walls;
   c) a front panel which extends upwardly from the bottom panel and is adapted to overlie the front wall of a vehicle truck box, wherein the front panel adjoins the two side panels;
   d) a rail which extends horizontally outwardly from at least one upwardly extending liner panel and which defines a downwardly depending outwardly facing perimeter edge, wherein portions of said panel define a first undercut member which extends beneath the rail; and
   e) a second undercut member which depends from the rail perimeter edge opposite the first undercut member and which extends inwardly toward the first undercut member beneath the rail.

19. The thermoformed thermoplastic truck bed liner of claim 18 wherein the rail extends from the liner front panel and the first undercut member extends beneath a front rail of the truck box front wall.

20. The thermoformed thermoplastic truck bed liner of claim 18 further comprising a member which extends outwardly from the second undercut member away from the first undercut member.

* * * * *